United States Patent
Beer et al.

(10) Patent No.: US 7,857,518 B2
(45) Date of Patent: Dec. 28, 2010

(54) ANTIFRICTION BEARING RACE, PARTICULARLY FOR HIGHLY STRESSED ANTIFRICTION BEARINGS IN AIRCRAFT POWER UNITS

(75) Inventors: Oskar Beer, Landshut (DE); Edgar Streit, Poppenlauer (DE)

(73) Assignee: Schaeffler KG, Herzogenaurach (DE)

( * ) Notice: Subject to any disclaimer, the term of this patent is extended or adjusted under 35 U.S.C. 154(b) by 554 days.

(21) Appl. No.: 11/914,616

(22) PCT Filed: May 6, 2006

(86) PCT No.: PCT/DE2006/000784

§ 371 (c)(1),
(2), (4) Date: Dec. 13, 2007

(87) PCT Pub. No.: WO2006/122518

PCT Pub. Date: Nov. 23, 2006

(65) Prior Publication Data

US 2008/0212911 A1    Sep. 4, 2008

(30) Foreign Application Priority Data

May 18, 2005  (DE) .................. 10 2005 022 730

(51) Int. Cl.
*F16C 33/64* (2006.01)
(52) U.S. Cl. ...................... 384/492; 384/569
(58) Field of Classification Search ................ 384/276, 384/280, 490, 492, 513, 569
See application file for complete search history.

(56) References Cited

U.S. PATENT DOCUMENTS

| | | | | |
|---|---|---|---|---|
| 2,845,311 A | * | 7/1958 | Cobb | 384/569 |
| 3,409,966 A | * | 11/1968 | Hilbish | 384/276 |
| 3,665,585 A | | 5/1972 | Dunn et al. | |
| 3,762,881 A | * | 10/1973 | Dunn | 428/548 |
| 3,770,332 A | * | 11/1973 | Dunn | 384/276 |
| 3,772,935 A | | 11/1973 | Dunn et al. | |
| 3,791,706 A | * | 2/1974 | Dobson | 384/569 |
| 4,566,810 A | * | 1/1986 | Yoshioka et al. | 384/280 |
| 5,439,297 A | * | 8/1995 | Kitayama | 384/492 |
| 2003/0019106 A1 | | 1/2003 | Pope et al. | |

FOREIGN PATENT DOCUMENTS

| | | |
|---|---|---|
| DE | 27 45 527 | 4/1978 |
| DE | 29 38 812 | 4/1980 |
| JP | 56 163821 A | 9/1983 |
| WO | 2005/030417 A | 4/2005 |

* cited by examiner

Primary Examiner—Thomas R Hannon
(74) Attorney, Agent, or Firm—Lucas & Mercanti, LLP

(57) ABSTRACT

An antifriction bearing race, particularly for highly stressed antifriction bearings in aircraft power units, which have a fixed joining of two layers made of different metallic materials, with an area of the raceways for the roller bodies being made of a steel with a very high degree of hardness and resistance to wear, and the core area of the antifriction bearing race being made of a high-strength steel. A powder-metallurgical high-speed steel has a high content of carbide-forming alloying elements and a high carbon content is provided as the material for the raceway of the roller bodies, whereas the material for the core area of the antifriction bearing race is made of a hot-work steel with, in comparison to the raceway material, a lower content of carbide-forming alloying elements and with a low carbon content, both materials being joined to one another with material fit by diffusion welding.

3 Claims, 4 Drawing Sheets

ANTIFRICTION BEARING RACE, PARTICULARLY FOR HIGHLY STRESSED ANTIFRICTION BEARINGS IN AIRCRAFT POWER UNITS

FIELD OF THE INVENTION

The invention relates to a rolling bearing ring according to the features of the preamble of patent claim 1, which rolling bearing ring is particularly suitable for highly-loaded rolling bearings in aircraft power plants, and to a method for producing a rolling bearing ring of said type.

BACKGROUND OF THE INVENTION

It is generally known to persons skilled in the art of power plant technology in aircraft that primarily heat-resistant bearing materials such as M50 (80 MoCr V 42-16, 1.3551) or else heat-resistant care-hardened steels such as M50 NiL (13MoCrNi 42-16-14, 1.3555) are used for the bearing rings of highly-loaded rolling bearings, such as for example the main shaft bearing of aircraft power plants, on account of the high operating temperatures. Said materials, after carburization and hardening in the region of the raceway, have a high hardness, and in the non-carburized core region of the bearing ring, have a high level of ductility. The composition of said material, with the exception of the carbon content, is however constant over the entire cross section of the bearing ring. The different demands on the raceways of the bearing rings, such as high rolling strength and wear resistance, and on the core regions of the bearing rings, such as a high level of ductility, can therefore be realized only to a restricted extent.

One possibility for better meeting the high demands on rolling bearings in aircraft power plants is therefore to produce the rolling bearing rings from a fixed composite of two layers of different metallic materials, that is to say to form the region of the raceway for the rolling bearings from a steel with a very high level of hardness and wear resistance, and to form the core region of the rolling bearing ring from a steel with a high level of ductility.

A rolling bearing ring of said type composed of a composite material is known for example from DE 27 45 527 A1. Said rolling bearing ring is composed of a first ring which forms the raceway for the rolling bodies and is composed of a rolling bearing steel which is alloyed with chrome, and of a second ring which forms the core region of the rolling bearing ring and is composed of a corrosion-resistant steel with a low carbon content. In order to be connected to one another, said two rings, which are formed so as to be of the same volume as one another, are plugged into one another concentrically and are deformed radially, by means of profiled rollers, until a chamber which corresponds to the dimensions of the bearing ring is filled, with the simultaneous formation of the raceways for the rolling bodies. The rings subsequently undergo heat treatment and are fixedly connected to one another by means of shrinkage and are finally finished by means of turning of the diameter and grinding.

A disadvantage of said rolling bearing ring composed of a composite material is that the two rings composed of different materials are jointly and simultaneously deformed tangentially, radially and axially by means of rolling and are connected to one another. It is however known from practice that in particular cold-rolling of high-temperature-resistant and wear-resistant materials can be carried out only to a limited extent, since said materials generally have a different capacity for expansion. As a result, a permanent connection of the two rings is problematic, so that a fixed bond between the rings is only obtained in exceptional cases even with the subsequent shrinkage. Likewise, a thickness of the layers of the two materials which varies over the width of the raceway and is adapted to the respective application cannot be realized with the described method of production. Since the rings are not directly materially connected to one another, a bond of said type has proven to be insufficient with regard to its durability in order to meet the high demands on rolling bearings in aircraft power plants. In addition, a plurality of production steps and tools and also a plurality of split tool dies are required to implement the production method for a bearing ring of said type, as a result of which relatively high production costs are generated for a rolling bearing which is formed with bearing rings of said type.

A further possibility for the production of a rolling bearing ring from a composite material is additionally disclosed by DE 29 38 812 A1. In the rolling bearing ring described in this document, the first ring which forms the raceway for the rolling bodies is likewise produced from a rolling bearing steel which is alloyed with chrome and which is produced by means of punching and drawing a corresponding sheet metal strip. The second ring which forms the core region of the rolling bearing ring is composed, in contrast, of a metal powder which, for connecting to the first ring, is filled together with the latter into a die and is compressed under pressure and at temperatures of between 300° C. and 700° C. in a press. The billet which is generated is subsequently sintered in a furnace at temperatures of between 1100° C. and 1200° C. and is cooled in an oxygen-free atmosphere to 950° C. to 1000° C., and finally, the raceway for the rolling bodies is formed in the rolling bearing ring by means of closed die forging or by rolling.

In a rolling bearing ring produced according to said method, although the two rings of the material composite are also cohesively connected to one another by means of the sintering process, it is also the case here, as a result of the use of a punched metal sheet for the raceway region, that the layer thickness of said raceway is largely constant and cannot be varied in a desirable way in terms of its thickness over the width of the raceway. Likewise, it is also the case in this material composite that the final common rolling or forging of the heat-resistant and of the wear-resistant material for the core region and for the raceway region can be implemented only with a very great deal of expenditure in terms of production. In addition, the expenditure for the production of a material composite of said type has proven to be uneconomical in practice, in particular because a separate die for compressing and for sintering the metal powder must be provided for each individual bearing ring, and also as a result of the complex compression and cooling process of the sintered metal.

OBJECT OF THE INVENTION

Proceeding from the described disadvantages of the solutions of the known prior art, the invention is therefore based on the object of designing a rolling bearing ring, in particular for highly-loaded rolling bearings in aircraft power plants, which rolling bearing ring is composed of a durable composite of two layers composed of a steel with a very high level of hardness and wear resistance for the region of its raceway and of a steel with a high level of ductility for its core region, and at the same time, is formed with a largely variable layer thickness of the raceway over the raceway width, and which rolling bearing ring is characterized by cost-effective production.

DESCRIPTION OF THE INVENTION

According to the invention, said object is achieved in a rolling bearing ring in that a powder metallurgical high-speed steel with a high content of carbide-forming alloy elements and a high carbon content is provided as a material for the raceway of the rolling bodies, while the material for the core region of the rolling bearing ring is composed of a hot-work steel with a lower content of carbide-forming alloy elements, and a lower carbon content, than the raceway material, and in that the two materials are cohesively connected to one another by means of diffusion welding.

The invention is therefore based on the realization that, by means of diffusion welding, it is possible to produce wear-resistant material composites with a high level of hot hardness, which material composites can meet the different demands on the raceway and on the core region of a highly-loaded rolling bearing in a virtually optimal fashion. After suitable heat treatment, a powder metallurgical high-speed steel as a material for the raceway of the rolling bodies has, as a result of the high content of hard phases (carbides), a significantly better level of wear resistance than carburized case-hardened steel M50 NiL. On account of the very fine homogeneous microstructure, the rolling strength of the raceway region is very high despite the high carbide content. A retroactive compression of the composite is also not necessary, since as a result of the simultaneous action of high temperature and high pressure, materials without residual porosity are generated. The hot-work steel for the core region of the rolling bearing ring can additionally be designed, with regard to its composition, and in contrast to the raceway material, to have a high level of ductility, but must be adapted with regard to its hardening behavior to the hardening process for the raceway material.

Preferred embodiments and refinements of the rolling bearing ring designed according to the invention are described in the subclaims.

Accordingly, it is provided that the material for the raceway of the rolling bodies is preferably formed by the high-speed steel S 10-2-5-8 PM which has more than 5% alloy constituents Cr, Mo, W and V and whose carbon content is greater than 0.8%, while the material for the core region of the rolling bearing ring is preferably formed by the hot-work steel X40CrMoV5-1 which has less than 12% alloy constituents Cr, Mo, W and V and whose carbon content is less than 0.5%.

The set object is additionally achieved by means of a method according to the invention for producing a rolling bearing ring having the described features, which method is described below on the basis of the example of the production of a rolling bearing inner ring and of a rolling bearing outer ring:

For the production of rolling bearing inner rings, a rod-shaped steel cylinder composed of the hot-work steel X40CrMoV5-1 is preferably used as a starting material for the core region, while the starting material for the production of rolling bearing outer rings is preferably formed by a thick-walled steel tube composed of the same material. Additionally required as an auxiliary tool is a thin-walled cylindrical steel capsule of the height of the steel cylinder or of the steel tube, into which steel capsule, in the case of production of rolling bearing inner rings, the steel cylinder is inserted centrally, or in the case or production of rolling bearing outer rings, the steel tube is inserted so as to bear concentrically against the inner side of the steel capsule. The space between the steel cylinder and the inner side of the steel capsule or the cavity of the steel tube is subsequently filled with the high-speed steel S 10-2-5-8 PM, which is provided in powder form, of the raceway material, and is compressed manually.

The steel capsule which is prepared in this way is then closed off at its open end and, if appropriate, evacuated and subjected, in a suitable furnace, simultaneously to a pressure of approximately 1000 bar and a temperature of 1000° C. to 1200° C. By means of said process, which is referred to as diffusion welding by means of hot isostatic pressing, the sintering of the metal powder of the raceway material to form a dense material, and a material connection of the sintered metal to the steel cylinder or to the steel tube of the core region, take place simultaneously.

After the cooling of the composite billet, which is generated in this way, to room temperature, and the removal of the steel capsule, the composite billet is then provided, on an automatic lathe, with a central bore, and is at the same time cut into individual composite rings. In the case of the production of rolling bearing inner rings, the bore is formed into the material of the core region, while in the case of the production of rolling bearing outer rings, said bore is formed in the material of the raceway.

A raceway groove is subsequently formed in the raceway material of the composite ring, which is generated by means of the cutting, by means of rolling between two profiled rollers, with the rolling formation of said raceway groove having the object of creating an optimum layer thickness of the raceway material in the entire region of the eventual raceway or over the entire width thereof.

The production of the approximate outer contour of the rolling bearing ring then takes place by means of cutting of the composite ring with subsequent hardening and grinding to the final bearing ring dimensions. The hardening of the rolling bearing ring preferably takes place at a temperature between 1000° C. and 1200° C., so that the raceway material has a hardness of at least 750 HV and the material of the core region has a hardness of at least 500 HV.

The rolling bearing ring produced according to said method and designed according to the invention therefore has the advantage over the rolling bearing rings known from the prior art that it is composed of a durable composite of two layers composed of a steel with a very high level of hardness and wear resistance for the region of its raceway and of a steel with a high level of ductility for its core region, and can be formed by means of a targeted profile rolling process with a largely variable layer thickness of the raceway over the raceway width. As a result of the diffusion welding by means of hot isostatic pressing, not only is the powder metallurgical high-speed steel for the raceway region sintered, but at the same time, a material connection to the material of the core region is obtained, as a result of which the produced rolling bearing ring on all accounts meets the high demands on rolling bearings in aircraft power plants. As a result of relatively cost-effective starting materials, simple auxiliary devices and moderate production expenditure, the rolling bearing ring designed according to the invention is also characterized overall by cost-effective production despite individual cutting production steps.

BRIEF DESCRIPTION OF THE DRAWINGS

One preferred embodiment of a rolling bearing ring designed according to the invention and of the method for its production are explained in more detail below with reference to the appended drawings, in which.

DETAILED DESCRIPTION OF THE DRAWINGS

Figure 1:
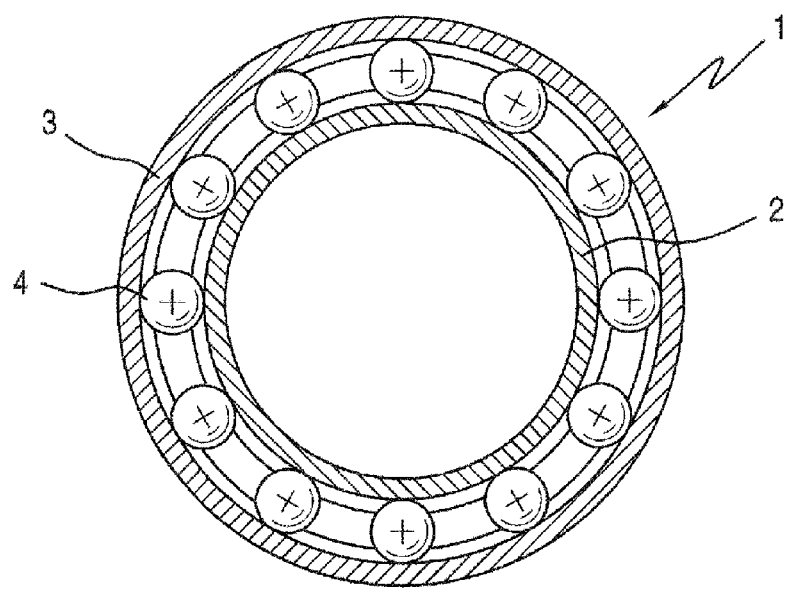
FIG. 1 shows a longitudinal section through a main shaft bearing, which is embodied as a three-point ball bearing, of an aircraft power plant.
Figure 2:
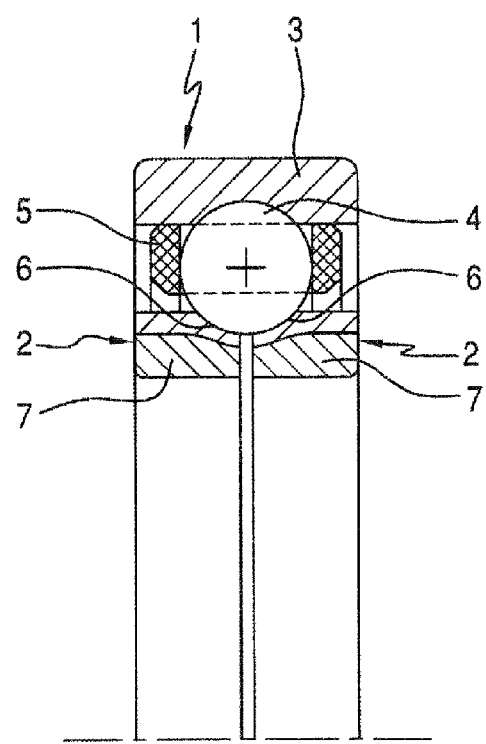
FIG. 2 is an enlarged illustration of a cross section through the three-point ball bearing according to FIG. 1.

FIGS. 1 and 2 clearly show a rolling bearing 1, which is designed as a three-point ball bearing, as is used for example for mounting the main shaft in aircraft power plants. Said rolling bearing 1 is composed, in a known way, of a two-part inner rolling bearing ring 2 and a single-part outer rolling bearing ring 3 and of a plurality of rolling bodies 4 which roll between the rolling bearing rings 2, 3 and which are held at uniform intervals with respect to one another by means of a bearing cage 5. FIG. 2 indicates that at least the inner rolling bearing ring 2 of the rolling bearing 1 is composed of a fixed composite of two layers composed of different metallic materials, with the region of the raceway 6 for the rolling bodies 4 being formed from a steel with a very high level of hardness and wear resistance and the core region 7 of the rolling bearing ring 2 being formed from a steel with a high level of ductility.

In order to meet the high demands on a rolling bearing ring 2 of said type with regard to temperature resistance, wear resistance and ductility, according to the invention, a powder metallurgical high-speed steel with a high content of carbide-forming alloy elements and a high carbon content is provided as a material for the raceway 6 of the rolling bodies 4, while the material for the core region 7 of the rolling bearing ring 2 is composed of a hot-work steel with a lower content of carbide-forming alloy elements, and a lower carbon content, than the raceway material 11. According to the invention, the two materials are cohesively connected to one another by means of diffusion welding, with the material for the raceway 6 of the rolling bodies 4 being formed by the high-speed steel S 10-2-5-8 PM which has more than 5% alloy constituents Cr, Mo, W and V and whose carbon content is greater than 0.8%, while the material for the core region 7 of the rolling bearing ring 2 is formed by the hot-work steel X40CrMoV5-1 which has less than 12% alloy constituents Cr, Mo, W and V and whose carbon content is less than 0.5%.

The method for producing an inner rolling bearing ring 2 which is designed according to the invention is now explained by way of example on the basis of FIGS. 3 to 8.

Figure 3:
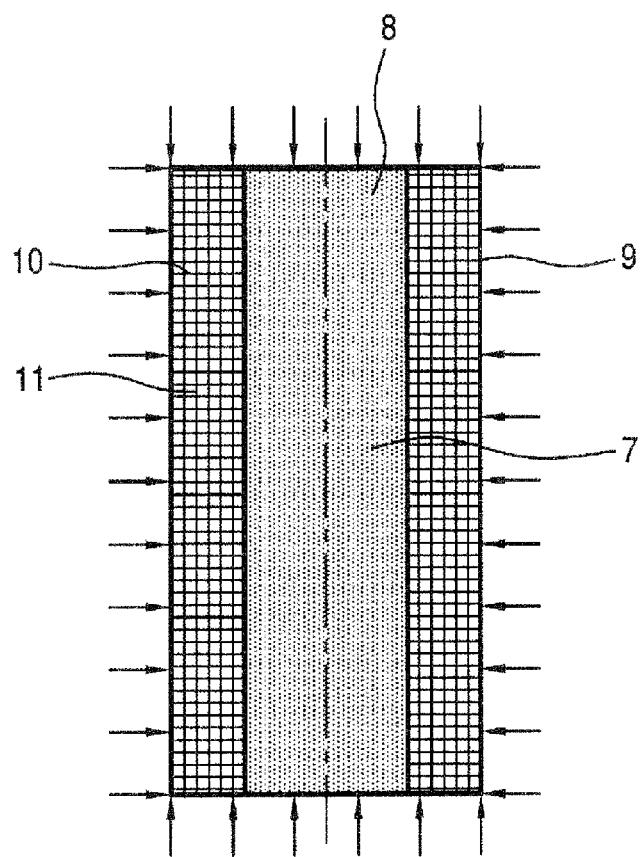
FIG. 3 is a schematic illustration of the method steps a) to c) for the production of an inner rolling bearing, which is designed according to the invention, for the three-point ball bearing as per FIG. 1.

FIG. 3 shows that, firstly, a steel cylinder 8 composed of the material of the core region 7 of the rolling bearing ring 2 is inserted into a thin-walled cylindrical steel capsule 9, and the cavity 10 between the steel cylinder 8 and the steel capsule 9 is subsequently filled with the metal powder of the raceway material 11, and is manually compressed. With the steel capsule 9 which is prepared in this way, the sintering of the raceway material 11, and the simultaneous material connection of said raceway material 11 to the steel cylinder 8 by diffusion welding by means of hot isostatic pressing, then take place. In the process, the steel capsule 9 is subjected to a high pressure, indicated in FIG. 3 by arrows, of approximately 1000 bar and a temperature of 1000° C. to 1200° C., so that the metal powder of the raceway material 11 is compressed to form a sintered steel, and is at the same time connected to the steel of the core region 7.

Figure 4:
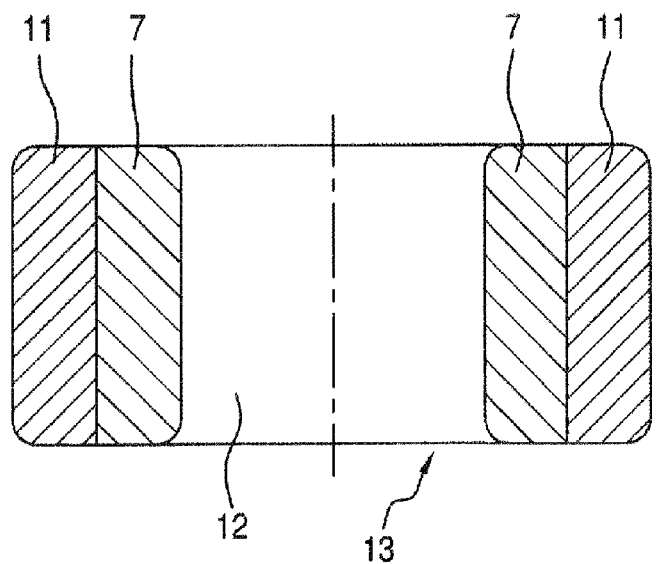
FIG. 4 is a schematic illustration of the method step d) for the production of an inner rolling bearing, which is designed according to the invention, for the three-point ball bearing as per FIG. 1.
Figure 5:
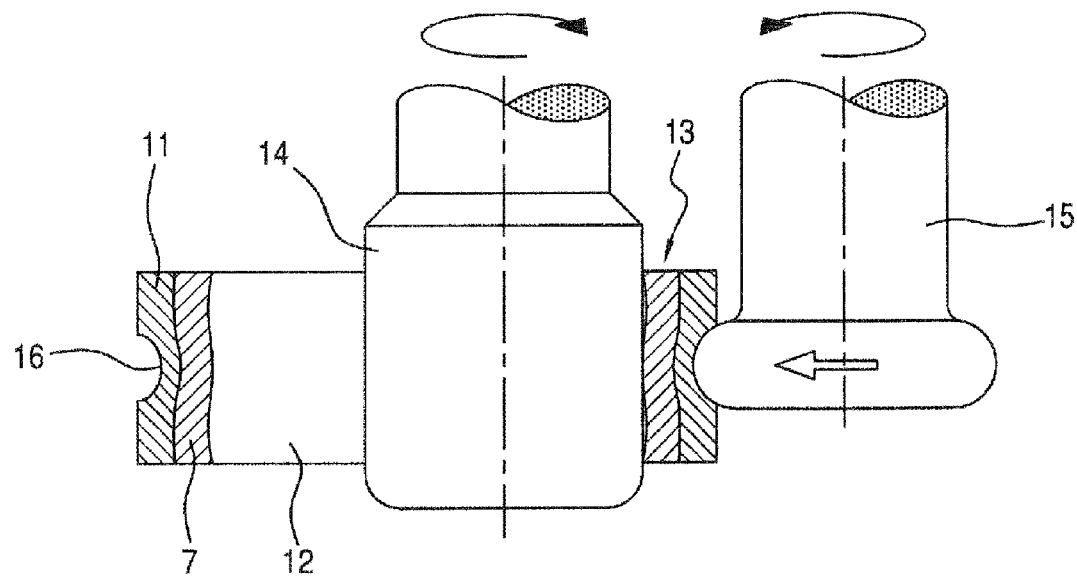
FIG. 5 is a schematic illustration of the method step e) for the production of an inner rolling bearing, which is designed according to the invention, for the three-point ball bearing as per FIG. 1.
Figure 6:
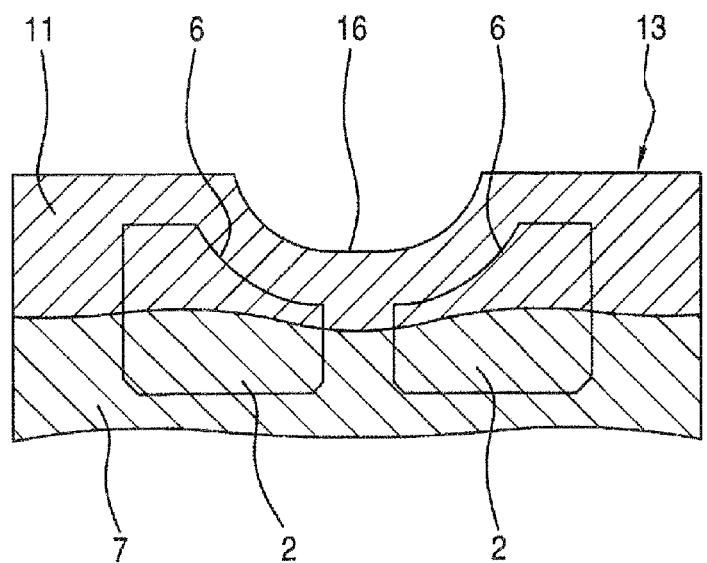
FIG. 6 is a schematic illustration of the method step f) for the production of an inner rolling bearing, which is designed according to the invention, for the three-point ball bearing as per FIG. 1.

After the cooling of the resulting composite billet, the formation of a central bore 12 into the material of the core region 7 then takes place on an automatic lathe, and the cutting of the composite billet into individual composite rings 13 then takes place, of which one composite ring 13 is depicted by way of example in FIG. 4. By means of the bore 12, it is then possible, as illustrated in FIG. 5, for a raceway groove 16 to be formed into the raceway material 11 of each composite ring 13 by means of rolling between two profiled rollers 14, 15, as a result of which, as can be seen in the enlarged illustration in FIG. 6, an optimum layer thickness of the raceway material 11 is created over the entire width of the eventual raceway 6, which is illustrated by way of indication, of the rolling bearing ring 2.

Figure 7:
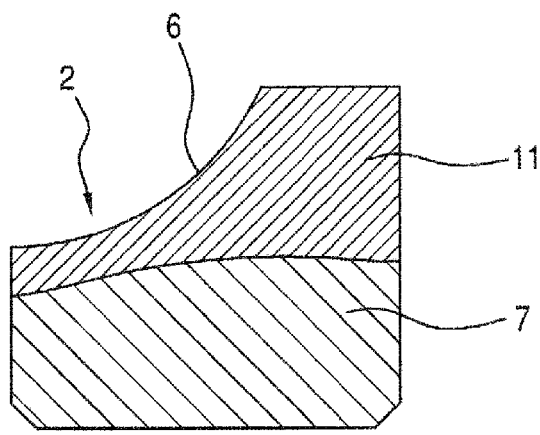
FIG. 7 is an enlarged illustration of a cross section through a finished inner rolling bearing ring, which is designed according to the invention, for the three-point ball bearing as per FIG. 1.
Figure 8:
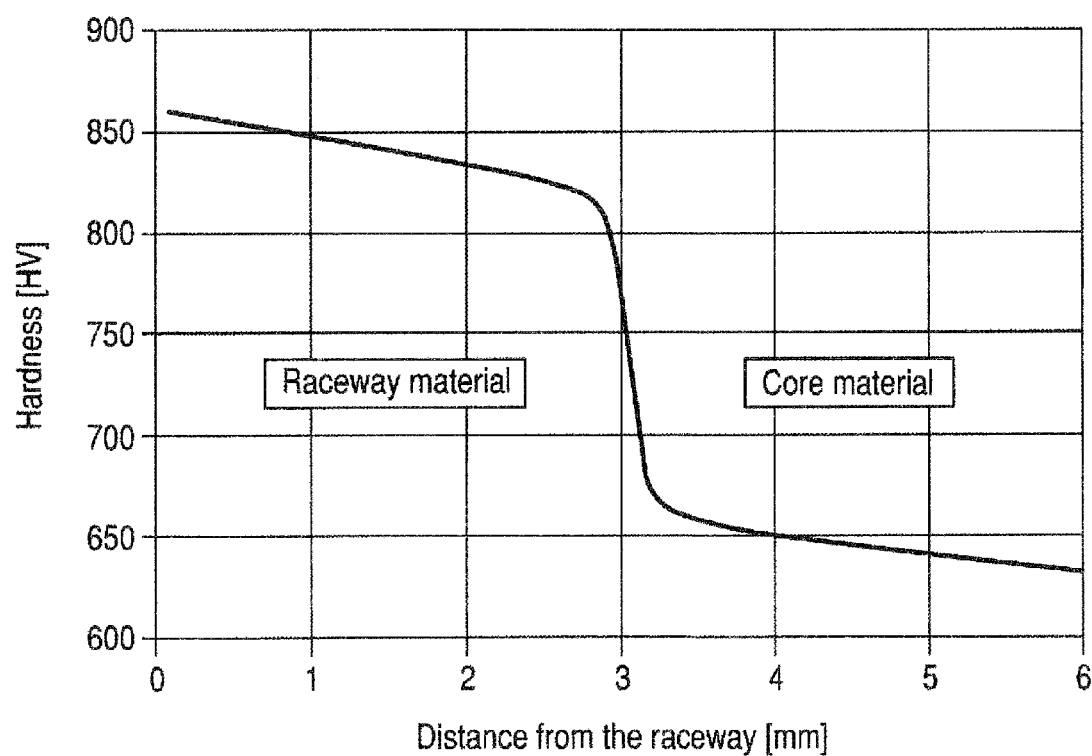
FIG. 8 is a graphic illustration of the hardness profile through an inner rolling bearing ring, which is designed according to the invention, for the three-point ball bearing as per FIG. 1.

Finally, the production of the approximate outer contour of the rolling bearing ring 2, which is illustrated in detail in FIG. 7, then takes place by means of cutting of the composite ring 13 and the finishing of the rolling bearing ring 2 then takes place by means of hardening at a temperature of between 1000° C. and 1200° C. and grinding to final bearing ring dimensions. The hardness diagram depicted in FIG. 8 shows that, after the hardening, the raceway material 11 has a hardness of approximately 870 HV, which decreases slightly with increasing depth, and falls sharply in the transition region between the raceway material 11 and the material of the core region 7. The material of the core region 7 then has, after the transition region, a hardness of approximately 670 HV which falls slightly further in the direction of the inner side of the rolling bearing ring 2 to a hardness of approximately 630 HV.

LIST OF REFERENCE SYMBOLS

1 Rolling bearing
2 Inner rolling bearing ring
3 Outer rolling bearing ring
4 Rolling bearing
5 Bearing cage
6 Raceway
7 Core region
8 Steel cylinder
9 Steel capsule
10 Cavity
11 Raceway material
12 Bore
13 Composite ring
14 Roller
15 Roller
16 Raceway groove

The invention claimed is:

1. A rolling bearing ring for highly-loaded rolling bearings in aircraft power plants comprising a ring of a fixed composite of two layers composed of different metallic materials, with a region of raceways for rolling bodies being composed of a steel with a very high level of hardness and wear resistance, and a core region of the ring being composed of a steel with a high level of ductility, wherein a powder metallurgical high-speed steel with a high content of carbide-forming alloy elements and a high carbon content is provided as a material for the raceway of the rolling bodies, while the material for the core region of the ring is composed of a hot-work steel with a lower content of carbide-forming alloy elements, and a lower carbon content, than the raceway material, and in that the two materials are cohesively connected to one another by means of diffusion welding.

2. The rolling bearing ring as claimed in claim 1, wherein the material for the raceway of the rolling bodies is formed from high-speed steel S 10-2-5-8 PM which has more than 5% alloy constituents Cr, Mo, W and V and whose carbon content is greater than 0.8%.

3. The rolling bearing ring as claimed in claim 1, wherein the material for the core region of the rolling bearing ring is formed from hot-work steel X40CrMoV5-1 which has less than 12% alloy constituents Cr, Mn, W and V and whose carbon content is less than 0.5%.

\* \* \* \* \*